W. P. COLDREN.
CHAIN AND FLIGHT CONNECTION.
APPLICATION FILED JUNE 18, 1913.
1,113,309.
Patented Oct. 13, 1914.
2 SHEETS—SHEET 1.
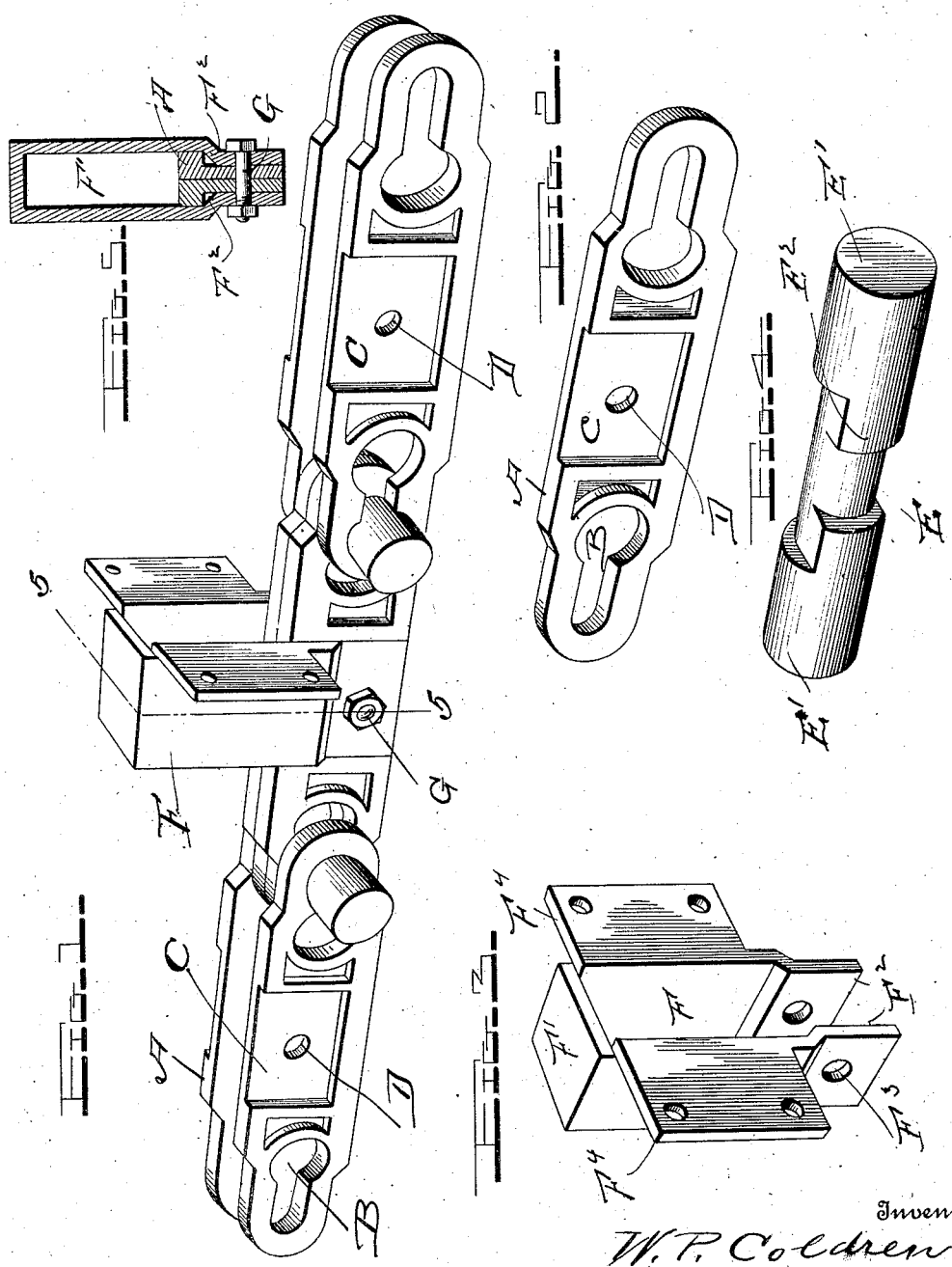

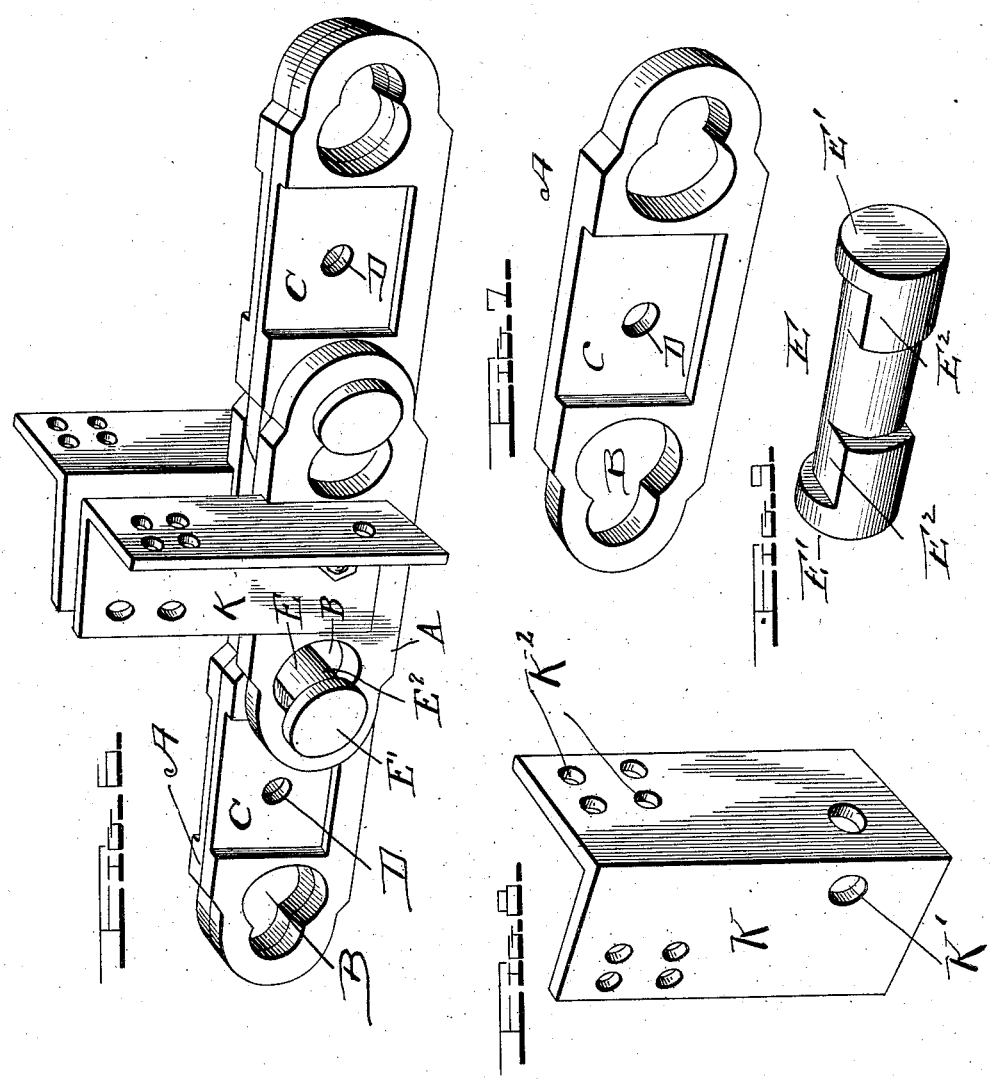

UNITED STATES PATENT OFFICE.

WILLIAM P. COLDREN, OF LEBANON, PENNSYLVANIA.

CHAIN AND FLIGHT CONNECTION.

1,113,309.   Specification of Letters Patent.   Patented Oct. 13, 1914.

Application filed June 18, 1913. Serial No. 774,432.

*To all whom it may concern:*

Be it known that I, WILLIAM P. COLDREN, a citizen of the United States, residing at Lebanon, in the county of Lebanon and State of Pennsylvania, have invented a new and useful Improvement in Chains and Flight Connections, of which the following is a specification.

This invention relates generally to chains and more particularly to the novel construction of link and also to the novel means for connecting flights to said links for the purpose of constructing conveyers.

The object of my invention is to provide a novel construction of link which can be used in the manufacture of conveyer or elevator chains as either an inside or an outside link and another object of my invention is to provide a link of such construction that in connection with a novel form of pin, said links can be securely connected together without the aid of bolts, nuts and rivets and a still further object of the invention is to provide a link to which the flight attaching means can be securely fastened in the assemblage of links constituting the chain.

Another object is to provide a flight conveyer of such construction that when properly assembled or positioned upon the links the several parts will be held together without the aid of a bolt, the bolt being employed for merely the purpose of maintaining the parts in their proper relative positions, all strain being relieved therefrom.

With these various objects in view, my invention consists in the novel features of construction, combination and arrangement all of which will be fully described hereinafter and pointed out in the claims.

In the drawings forming a part of this specification: Figure 1 is a perspective view of a plurality of chain links connected together and having one of the flight connectors attached thereto. Fig. 2 is a detail perspective view of one of the links. Fig. 3 is a detail perspective view of the flight connector. Fig. 4 is a detail perspective view of the pin. Fig. 5 is a section on the line 5—5 of Fig. 1. Fig. 6 is a detail perspective view showing a number of links connected together and illustrating a slight modification of the flight connector. Fig. 7 is a detail perspective view of the link. Fig. 8 is a detail perspective view of one of the angle shaped connectors. Fig. 9 is a detail perspective view of the connecting pin.

In carrying out my invention I employ a link A, which may be six inches, nine inches, or any other desired length and the depth and thickness of the link can be governed according to the nature of the work desired. These links A are elongated as shown and adjacent each end are constructed with key-hole shaped openings B the narrow portion thereof extending toward the adjacent end of the link. At the central portion of the link one face thereof is recessed as shown at C, said recess extending from one edge of link to a point adjacent the opposite edge, said recess being rectangular in shape and of uniform depth and thickness. This recessed portion of the link is apertured as shown at D, the opposite face of the link being countersunk as shown at D'.

In making up the chain the two links are placed with their flat faces together and their openings in register, and these links so placed are termed inside links, and connected to these two inside links are two outside links identical in construction to the inside links but arranged one upon each side of the combined inside links and in order to connect these inside and outside links together in pivotal connection, I employ pins E, having heads E', of larger diameter than the pin proper, said heads being of a size to pass through the large portion of the openings B while the pin proper is of a size to fit into the narrow portion of said openings B. The pins E are also constructed with parallel faced lugs E², adjacent the heads so that the pin will be held in fixed relation with the outside links while the inside links will be free to turn upon the central or round portion of the pin.

In some instances it may be desirable to lock the pin within the inside links and in that case instead of providing parallel faced lugs E² adjacent the heads E' I construct the pin with a single parallel faced lug E³ at the central portion of the pin.

It will of course be understood that the links are first placed with their apertures so in register that the heads of pins can be passed through, and then by giving the links the proper longitudinal movement in opposite directions the pin will be forced into the narrow portion of the openings and the heads engaging the exterior of the links will securely bind all of the links in proper positions. By means of this construction, bolts and rivets are completely eliminated.

For the purpose of connecting the conveyer or elevator flight to the link, I employ a novel construction of connector which may be termed a saddle or yoke F, and which is essentially U-shaped for a greater portion of its height as shown at F', and then contracted and continued in parallel relation as shown at $F^2$, the contracted and parallel portions being apertured as shown at $F^3$, and the main body of the yoke or saddle is provided with oppositely disposed apertured wings $F^4$ to which a flight may be attached.

In attaching the connector to the links, I place two links with their flat faces together and bring their recessed portions opposite each other and then these links are passed together partially through the yoke or saddle and the contracted parallel portions brought into engagement with the recessed sides of the links and it will be seen that when so positioned they fit snugly into the recess and bind all of the various parts together, interlocking as it were, and in order to hold all of these parts in their proper positions I employ a bolt G, which is passed through the parallel apertured portions of the yoke or saddle and through the central portion of the links. Owing however, to the interlocking feature of the various elements, all strain is relieved from this bolt and a thoroughly rigid and durable connector is provided for connecting the flight to the links of the chain.

It will of course be understood that it is immaterial whether the yoke or saddle is placed from the under or upper side of the links so long as the contracted parallel portions are brought into engagement with the recessed portions of the links.

It will thus be seen that I provide a novel construction of link, a novel manner of connecting the same and a novel form of connection for the flight and link whereby all of the objects hereinbefore referred to are accomplished.

In Figs. 6 and 8 I show a slightly modified form of flight connector in the form of two angle plates K, said plates being of such size as to fit the recesses in the links and the apertures K' through which fastening bolts can be passed. These plates have two sets of apertures $K^2$ through which bolts are passed for the purpose of connecting the flights. Two series of openings are employed for the reason that sometimes these plates are attached to the links when said links are arranged as inside links and at other times when said links are arranged as outside links and the apertures or openings $K^2$ are so positioned that one set or the other of the apertures will register with the apertures in the flight.

What I claim is:—

1. The combination with a chain composed of a plurality of links, each link having a recess, intermediate its ends, said link being apertured at said recessed portion, of a flight connector consisting of a yoke portion having oppositely disposed wings adjacent the connecting member of said yoke the open ends of said yoke being apertured and contracted into parallel relation, said parallel ends being of such size and so spaced apart as to fit into the oppositely disposed recesses of parallel links and a bolt passing through said links and yoke ends as set forth.

2. The combination with a chain composed of a plurality of links each link having an open recess intermediate its ends said link being apertured at said recessed portion of a yoke portion comprising a connection member, parallel members provided with oppositely disposed laterally extending wings contracted portions and parallel free ends, said ends being apertured and so shaped and spaced apart as to fit into oppositely disposed recesses of parallel links, and a bolt passing through the apertured links and ends of yoke as set forth.

3. The combination with a pair of links, having side recesses of a yoke having oppositely disposed laterally projecting wings adjacent the connecting portion of said yoke, and free ends of said yoke being shaped and spaced apart as to fit into the oppositely disposed link recesses and a bolt passing through said opened yoke ends and links.

WILLIAM P. COLDREN.

Witnesses:
 G. H. BENDER,
 T. J. BURKEY.